(12) United States Patent
Nuzzio

(10) Patent No.: US 12,136,783 B2
(45) Date of Patent: Nov. 5, 2024

(54) WATERPROOF CONNECTION SYSTEM FOR CABLE/ELECTRODES/SENSORS

(71) Applicant: Donald Bernard Nuzzio, Ringoes, NJ (US)

(72) Inventor: Donald Bernard Nuzzio, Ringoes, NJ (US)

(*) Notice: Subject to any disclaimer, the term of this patent is extended or adjusted under 35 U.S.C. 154(b) by 612 days.

(21) Appl. No.: 17/387,991

(22) Filed: Jul. 28, 2021

(65) Prior Publication Data

US 2022/0059967 A1 Feb. 24, 2022

Related U.S. Application Data

(60) Provisional application No. 63/057,888, filed on Jul. 28, 2020.

(51) Int. Cl.

| H01R 13/52 | (2006.01) |
|---|---|
| G01N 30/02 | (2006.01) |
| H01R 13/523 | (2006.01) |
| H01R 13/622 | (2006.01) |

(52) U.S. Cl.
CPC ......... *H01R 13/5205* (2013.01); *G01N 30/02* (2013.01); *H01R 13/523* (2013.01); *G01N 2030/027* (2013.01); *H01R 13/622* (2013.01)

(58) Field of Classification Search
CPC .......................... H01R 13/5205; H01R 13/523; H01R 13/622; H01R 24/20; H01R 31/06; H01R 13/5221; H01R 2101/00; H01R 2107/00; G01N 30/02; G01N 2030/027; G01N 30/6034
See application file for complete search history.

(56) References Cited

U.S. PATENT DOCUMENTS

| 4,447,104 | A | * | 5/1984 | Haggard | H01R 13/523 |
|---|---|---|---|---|---|
| | | | | | 439/454 |
| 4,618,198 | A | * | 10/1986 | Dale | H01R 13/5219 |
| | | | | | 285/334.4 |
| 4,895,530 | A | * | 1/1990 | Gugelmeyer | H01R 13/623 |
| | | | | | 439/387 |
| 6,621,005 | B1 | * | 9/2003 | Lovec | H01R 13/5205 |
| | | | | | 174/74 R |
| 2005/0070141 | A1 | * | 3/2005 | Dopf | H01R 13/4538 |
| | | | | | 439/140 |

(Continued)

*Primary Examiner* — Travis S Chambers
(74) *Attorney, Agent, or Firm* — Rohm & Monsanto, PLC

(57) ABSTRACT

A waterproof electrical connector assembly releasably connects an electrical cable to a second cable, or to one or more electrodes or sensors in a housing that has a bore therethrough that accommodates the electrical cable on one end and a fitting on the other end. The fitting holds one or more electrodes/sensors in a bore through the fitting. The fitting is a commercially-available male-threaded polymeric fitting of the type used in High-performance Liquid Chromatography (HPLC) applications. This type of polymeric fitting has a conical, or tapered, ferrule portion at one end that is configured to fit securely into a female-threaded and chamfered bore in the housing so that when the fitting is tightened against the chamfered housing bore it forms a watertight seal which is waterproof to at least 10,000 psi. As the seal is formed, the components contact each other to form an electrical connection, illustratively, a connection from electrode or sensor probes to the cable leading to measuring equipment.

12 Claims, 3 Drawing Sheets

(56) References Cited

U.S. PATENT DOCUMENTS

| | | | |
|---|---|---|---|
| 2012/0164870 A1* | 6/2012 | Murphy | H01R 13/59 439/449 |
| 2014/0273540 A1* | 9/2014 | Brown | H01R 13/523 439/13 |
| 2014/0273580 A1* | 9/2014 | Ring | H01R 13/622 439/283 |

* cited by examiner

WATERPROOF CONNECTION SYSTEM FOR CABLE/ELECTRODES/SENSORS

RELATIONSHIP TO OTHER APPLICATION(S)

This application claims the benefit under 35 U.S.C. § 119(e) of U.S. Provisional Patent Application Ser. No. 63/057,888 filed on Jul. 28, 2020 in the name of the same inventor as herein. The disclosure in the identified United States Provisional Patent Application is incorporated herein by reference.

BACKGROUND OF THE INVENTION

Field of the Invention

This invention relates generally to an electrical connector system for attaching cables to electrodes and/or sensors, and more particularly, to a waterproof electrical connector system suitable for use in a high-pressure environment.

Description of the Related Art

Environmental sensors, for example, are frequently deployed underwater or in silt. There is a need for a waterproof connector for attaching electrical cables from the measuring equipment to the sensor/electrode probe(s), which might be, in some embodiments, a pin electrode or sensor. In particular, there is a need, particularly in deep undersea exploration, for underwater connectors that are waterproof to at least 10,000 psi.

SubConn Inc. and The MacArtney Underwater Technology Group, Denmark, and Teledyne Marine Impulse, San Diego, CA, sell underwater pluggable electrical connectors and cables. In one known example, the SubConn® micro-circular series-1 contact, the cable is soldered to the electrode/sensor, the whole assembly is epoxied and then shrink wrapped with a neoprene boot. Once assembled, the cable and sensor are not separable. There is a need, however, for a releasable connector to facilitate changing components.

Most known connectors rely on the use of O-rings seals to make a waterproof connection when mating male to female parts. One such example is the undersea connector described in U.S. Pat. No. 7,828,573. U.S. Pat. No. 7,828,573 illustrates the fact that O-rings, clamps, screws, and the like are used to secure underwater connections. O-rings, of course, are subject to failure and degradation over time. Moreover, the use of clamps, screws, O-rings, epoxy, etc. makes it difficult, if not impossible, to remove and/or replace components. There is, thus, a need for a releasable connector to facilitate exchanging components in case of failure or if a different type of electrode(s) is required to collect a difference data set. The ability to change components is particularly useful in applications where it is advantageous to sample the environment with multiple sensors.

SUMMARY OF THE INVENTION

The waterproof electrical connector assembly of the present invention releasably connects an electrical cable to a second cable, in some embodiments, or to one or more electrodes or sensors, in other embodiments, in a manner that is waterproof to at least 10,000 psi. The electrodes or sensors are, in one embodiment, of the type wherein a pin(s) protrudes from an electrode/sensor body. In an alternative embodiment, one or more conductive electrode/sensors are exposed at an end face of the electrode/sensor body for contact with the electrical cable that leads to the measuring equipment used to collect the output data of the electrode/sensors.

It is a particular advantage of the present invention that this can be inexpensively implemented, in some embodiments, with a commercially-available polymeric fitting which is used in High-performance Liquid Chromatography (HPLC) applications. Illustratively, the polymeric fitting is a male-threaded ferrule of the type used to set up an HPLC system. HPLC fittings, however, are not known for use as part of electrical connection systems. The HPLC fitting has a conical, or tapered, ferrule portion at one end that is configured to fit securely into a chamfer in the housing of the electrical connector assembly so that when the ferrule is tightened against the chamfered housing bore it forms a watertight seal.

The connector assembly in accordance with the present invention, comprises two main components, a housing and a nut portion. In one embodiment, a female housing has bore running through it which configured, at one end, to receive an electrical cable of the type which has a conductive lead, such as a pin, protruding from the end of the cable which is to be electrically connected to another part and which is shrouded in an insulating coating. The bore is configured at the other end to threadedly engage and accommodate a fitting which holds the second part, or parts, which are to be connected to the first cable. The second part may be a second cable and/or one or more pin electrodes and/or sensors, as described herein.

The fitting has a bore running through it which is sized to tightly accommodate the second part, which in preferred embodiments, is an electrode/sensor body that holds one or more electrode/sensors in an insulating sheath. The fitting has a nut portion at a first end which has a diameter that is greater than the diameter of the housing bore at the end of the housing that mates with fitting. The fitting has a conical ferrule portion at the other end which is threaded to engage with threads in the housing bore at the end which mates with the fitting. In this specific embodiment, the housing has internal (female) threads that engage with external (male) threads on the ferrule portion. The conical ferrule portion is also tapered at the end that engages the housing. The taper is configured to fit securely into a chamfer in the housing bore so that when the ferrule is tightened against the taper in the housing bore it forms a watertight seal.

In some embodiments of the waterproof electrical connector assembly of the present invention, the female housing may be stainless steel, however, in preferred embodiments, the female housing is a polymeric material which may be the same, or different, from the material comprising the fitting. In particularly preferred embodiments, the housing comprises polyetheretherketone (PEEK), acrylonitrile butyl-diene styrene (ABS), and nylon. The housing material, however, should be at least as hard as the material comprising the fitting.

The fitting can be stainless steel, too. However, in particularly preferred embodiments, the fitting is a polymer. Preferred polymers include polyetheretherketone (PEEK), polytetrafluoroethylene (PTFE), Polyoxymethylene (POM), polyphenylene sulfide (PPS), and polypropylene. In a particularly preferred embodiment, the polymeric material is polytetrafluoroethylene (Teflon®).

One of the outstanding advantages of the present invention is that the fitting is a standard, commercially-available, threaded fitting of the type used in High-Performance Liquid Chromatography. In preferred embodiment, the housing is made by 3D printing. Of course, the fitting can be made by 3D printing also.

In a specific embodiment of the present invention, the waterproof electrical connector assembly mates a cable having a conductive termination to a second cable having a conductive termination within the assembly. In this illustrative embodiment, the housing which has a housing bore extending through it is configured at a first end to accommodate a first polymeric fitting, of the type described herein, and is configured at the opposite (second) to accommodate a second polymeric fitting. A conductive metallic pin embedded in a central portion of the housing bore engages with the conductive terminations of the first and second cables so as to make an electrical connection when the first and second polymeric fittings, which hold the respective first and second cables, are urged into the housing by tightening the nut portions of the fittings to connect with each other while forming a pressure seal when the conical tapered ends of the fittings are urged into the chamfered end of the housing bore.

BRIEF DESCRIPTION OF THE DRAWING

Comprehension of the invention is facilitated by reading the following detailed description, in conjunction with the annexed drawing, in which.

DETAILED DESCRIPTION

In the connector assembly of the present invention, the cable is detachable from the electrode/sensor so that the components can be exchanged in case of failure or if a different type of electrode, for example, is required to collect a different data set. The electrode/sensor is held within a fitting which is threadedly engaged with a through-hole, or bore, in the assembly housing. The housing bore is configured to accommodate the cable at one end and the electrode/sensor-containing fitting at the other end. When the fitting is screwed into the housing it urges the contacts of the electrode/sensor into electrical communication with the cable. In advantageous embodiments, the fitting is tapered and fits into a matching chamfered end of the housing to form a water-tight pressure-fit.

It is to be understood, that one or multiple sensors/electrodes may be connected to a cable, or multiple cables, in the housing. For example, an electrode/sensor body may hold one or more electrode/sensors in an insulating sheath. Alternatively, multiple sensing elements may be embedded in the shaft of sensor probe body. The faces of one or more individual sensing elements are exposed so that they can contact the analyte at one end and at the other end, the respective lead(s) to the sensing elements can be are electrically connected in the interior of the housing to one or more cables that leading to the respective measuring instrumentation.

The following examples are illustrative of the principles of the invention.

1) Cable to Pin Electrode/Sensor

In this embodiment, an electrical cable is connected to a pin electrode, for example, of the type that can be used in an underwater environment, such for deep sea exploration. Of course, the pin shown here on an electrode/sensor could just be a contact to another cable as well.

Figure 1:
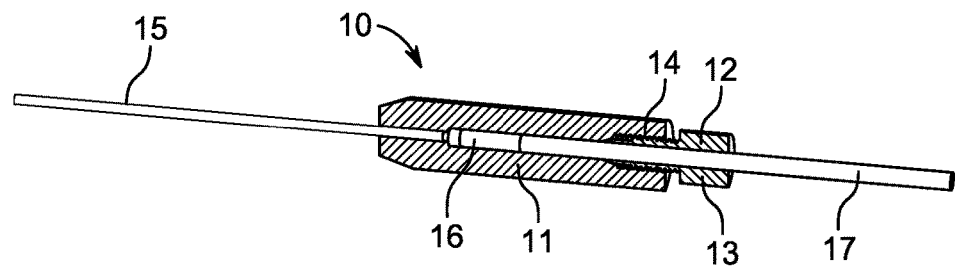
FIG. 1 is a cutaway view of a waterproof electrical connector assembly in accordance with the invention for releasably connecting a cable to an electrode/sensor.

Referring to FIG. 1, connector 10 comprises a housing or receiver 11 which is configured at one end to engage threadedly with a fitting 12 which may be, in preferred embodiments, a standard threaded fitting of the type used in High-performance liquid chromatography (HPLC), formerly referred to as high-pressure liquid chromatography.

Fitting 12 comprises a nut portion 13 and a conical ferrule portion 14. As shown in FIG. 1, the two portions of fitting 12 are integral parts of a unitary fitting. However, it is within the contemplation of the invention that these portions can be separate elements. Fitting 12 has a through-hole or bore 19 which is sized to tightly accommodate pin electrode/sensor 17 which is inserted in the bore so as to mate with cable 15 in the interior of receiver 11. Although not clearly shown in this figure, the sensor(s) are exposed at face 27 of electrode/sensor body 17. The sensors may be platinum, gold, or silver electrochemical sensors of the type known in the art. The diameter of nut portion 13 of fitting 12 should exceed the diameter of the internal bore of housing 11 where the fitting is received so as to augment the sealing capability of the fitting. Although the term diameter is used herein, it is to be understood that the operative principal is that the dimensions of the nut portion must exceed the dimensions the internal bore of the housing where it mates with the fitting.

Standard HPLC fittings may be purchased from Valco, Parker, Swagelok®, Waters® and IDEX Health & Science. Typical HPLC fittings may be stainless steel or a polymer, such as polyetheretherketone (PEEK), polytetrafluoroethylene (PTFE; e.g., Teflon® or Tefzel®, Polyoxymethylene (POM; Delrin®), polyphenylene sulfide (PPS), or polypropylene. In preferred embodiments, the fitting is made of a polymer, and preferably Teflon®. Use of a standard HPLC fitting is advantageous insofar as the fitting can be purchased commercially from multiple sources. Moreover, the HPLC fittings are designed and intended for use in a high pressure system and therefore can withstand high pressure in an underwater environment. While HPLC fittings are used to retain liquid in a chromatography system, we are using the fitting to keep water out of the connector assembly.

The body of the housing, or receiver 11, preferably comprises a polymer, such as polyetheretherketone (PEEK), acrylonitrile butyldiene styrene (ABS), or nylon. In preferred embodiments, the polymer comprising the housing is at least as hard as the polymer comprising the fitting and is inert, or resistant to chemical attack in the environment of use. We have found that 3-D printing is an ideal method of manufacturing the housing since bore 22 through housing 11 must be configured to accommodate the cables/sensor/electrodes/fittings as will be described hereinbelow.

Referring back to FIG. 1, a cable 15 is terminated with a female socket receptacle 16. In practice, the sheathing of cable 15 is stripped, and the female socket receptacle is soldered together. An electrode/sensor 17 has an embedded pin (not shown in this figure) which fits in female socket receptacle 16. In this embodiment, receiver 11 has internal threads and the ferrule portion 14 of fitting 12 has external threads. The thread size, of course, may vary. However, for high pressure applications, it is preferable to use denser threads per inch to resist the pressure generated in the receiving port. Illustratively, thread size 10-32 is typical for high pressure applications.

Tightening the nut portion 13 of fitting 12, whether by finger tightening or using a wrench, compresses the ferrule portion 14 against the outer sheath of electrode 17 to form a compression seal wherein electrode/sensor 17 is fully engaged with cable 15 inside connector 10.

Figure 2:
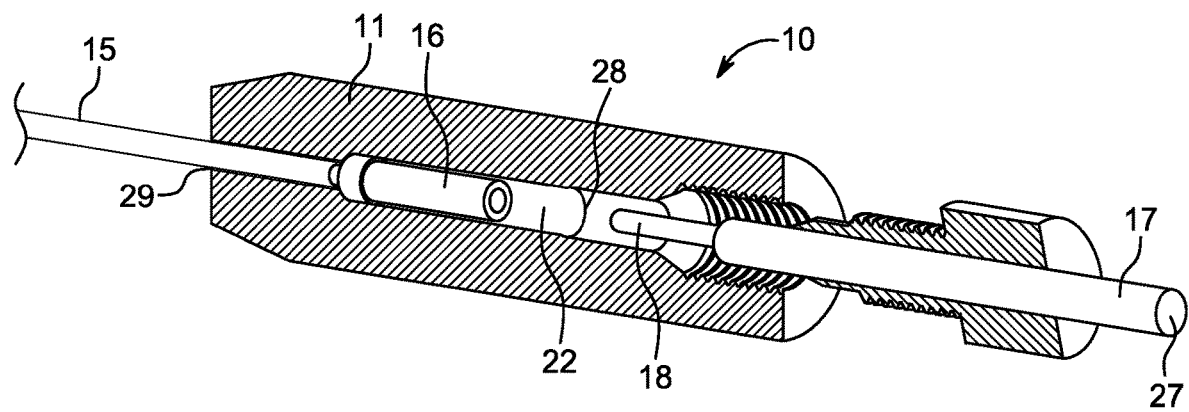
FIG. 2 is a cutaway view the waterproof electrical connector assembly of FIG. 1 wherein the electrode is partially removed to reveal an embedded pin and to show the configuration of a bore through the housing more clearly.
Figure 3:
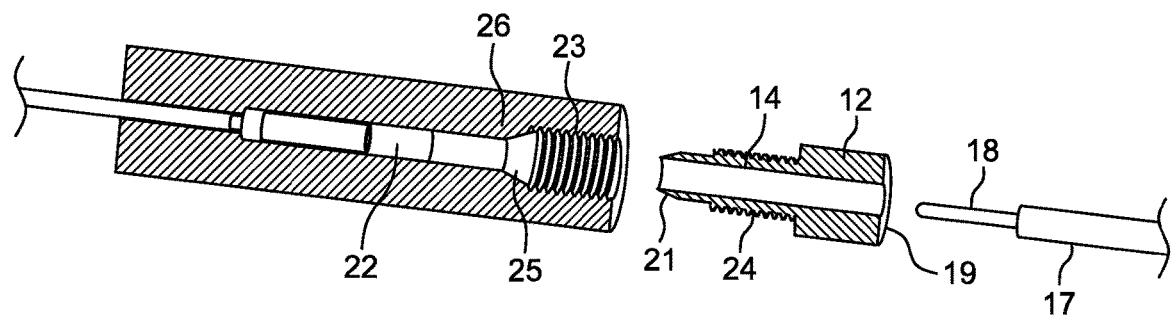
FIG. 3 is an exploded view of the waterproof electrical connector assembly of FIG. 1 and FIG. 2.

FIG. 2 shows the connector assembly 10 of FIG. 1 wherein electrode 17 is partially removed from the female socket receptacle 16 of cable 15 to reveal embedded pin 18 of electrode 17. FIG. 2 also shows the configuration of bore 22 through housing 11 more clearly. Referring to FIG. 3, conical ferrule 14 has a tapered end 21. Bore 22 through housing 11 is configured to accommodate tapered end 21 so that when ferrule 14 is tightened against the chamfered taper in bore 22 it forms a watertight seal. Bore 22 is also configured and sized to accommodate cable 15 and the female socket receptacle 16 which terminates cable 15 and accepts electrode pin 18. A stop 28, in the form of a ridge in bore 22 prevents female socket receptacle 16 from advancing beyond the ridge when it is placed in housing 11. Once the cable assembly 15/16 is in place in housing 11, it is sealed with an epoxy or resin at the opening on end 29 of housing 11 to prevent entry of water into the housing.

FIG. 3 is a fully exploded view of connector assembly 10. In practice, electrode 17 with embedded pin 18 is inserted in bore 19 of fitting 12 so that pin 18 extends beyond the threaded (male threads 24) and tapered end 21 of the ferrule portion 14. Fitting 12 is inserted into housing 11 and loosely tightened by turning clockwise to engage the female threads 23 of housing 11. Electrode/sensor 17 is then urged into contact with cable 15 by insertion in female socket receptacle 16. When fitting 12 is tightened more securely, fitting 12 is not only compressed against the outer sheath of electrode 17 but also forms a compression seal as tapered end 21 of ferrule 14 bears down on the smaller diameter end 26 of the tapered end 25 in bore 22 of housing 11. In this manner, electrode pin 18 of electrode/sensor 17 is fully engaged with cable 15 in connector 10.

2) Cable to Cable Connection (or Pin to Cable Connection)

Figure 4:
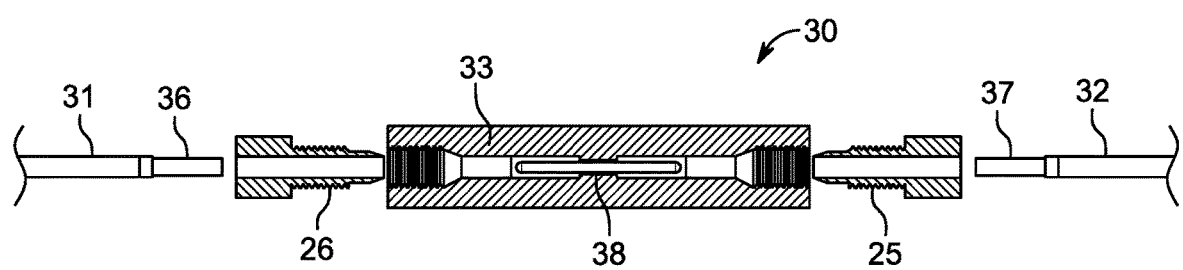
FIG. 4 is an exploded view of another embodiment of a waterproof electrical assembly of the present invention for releasably connecting two electrical cables.

FIG. 4 is an exploded view of another embodiment of a connector arrangement in accordance with the present invention. Referring to FIG. 4, Connector 30 joins two cables 31 and 32 together in a cylindrical housing 33 which has an internal bore 34 that accommodates two fittings, fitting 25 and fitting 26, of the type described hereinabove, one on each end of cylindrical housing 33. In this illustrative embodiment, cables 31 and 32 are terminated with female socket receptacles 36 and 37. A metallic pin 38 is embedded in the center of internal bore 34. Of course the ends of the cables can be terminated with any combination of male and female parts that mate with each other to make an electrical connection.

In practice, cable 32, for example, is inserted in fitting 25 and cable 31 is inserted in fitting 26. Each being installed in housing 33 in the same manner as described hereinabove for fitting 12 in housing 11. Thus, the cables are urged into electrical contact with each other as embedded pin 38 engages with the cables through their respective female socket receptacles.

A significant advantage of the connector of the present invention is that is quick release system which enable sensors to be easily changed by unscrewing the fitting and replacing same with a new fitting and/or sensor.

3) Cable(s) to Multiple Electrodes/Sensors

Figure 5:
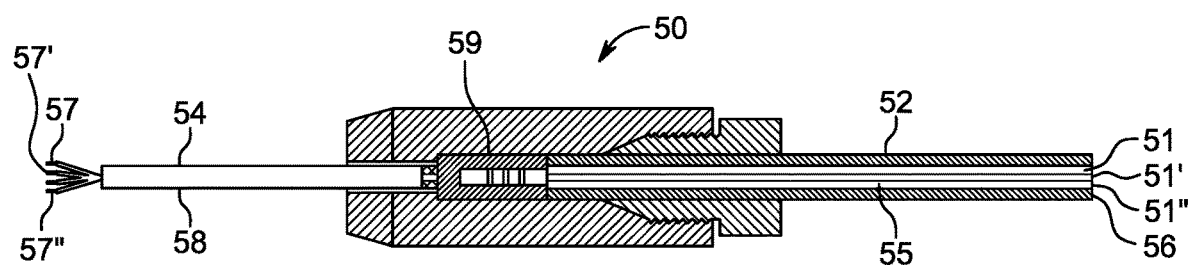
FIG. 5 is a partially cutaway view of an embodiment of a waterproof electrical assembly of the present invention wherein a multi-electrode/sensor probe is mated with a cable having multiple leads to electrically connect the multi-electrode/sensor probe to the measuring equipment.

Although the illustrative embodiments described hereinabove show a single pin connector, it is to be understood, that a multi-pin connector assembly is specifically within the contemplation of the invention. Referring to FIG. 5, a multi-electrode/sensor probe 52 has multiple sensing elements (51, 51', 51") embedded in the shaft 55 a sensor probe 52. The faces of the individual sensing elements 51, 51', 51" (not specifically shown in this figure) are exposed at the surface of end 56 so that they can contact the analyte. The sensor lead(s) (53, 53', 53") are electrically connected to the cable(s) 54 leading to the measuring instrumentation (not shown) in a waterproof electrical connector assembly 50 in accordance with the principles of the present invention. In the embodiment shown in FIG. 5, the cable 54 incorporates multiple leads 57, 57', 57" in an insulating sheath 58 which is terminated with a ferrule 59 at the end which electrically connects with the multi-electrode/sensor probe 52 in the interior bore of the housing.

These sensing electrodes may be, in a specific illustrative embodiment, the three electrodes required for voltammetry (reference, working, and counter electrode). Having the ability to incorporate multiple sensors into one unit allows for many different chemical species to be sensed in the environment under study. In this embodiment, it is possible to use a gold working electrode and another type of working electrode along with a platinum counter electrode and a silver/silver chloride reference electrode.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof. Moreover, the technical effects and technical problems in the specification are exemplary and are not limiting. The embodiments described in the specification may have other technical effects and can solve other technical problems.

What is claimed is:

1. A waterproof electrical connector assembly for releasably connecting a first cable to at least one second cable and/or one or more pin electrodes and/or sensors adapted for electrical contact with the at least one first cable within the assembly, the electrical connector assembly comprising
   1) a female housing which has a housing bore therethrough which is configured at a first end thereof to receive the first cable and configured at a second end thereof to accommodate a fitting and to engage threadedly with the fitting;
   2) a fitting having a fitting bore therethrough which is sized to tightly accommodate the at least one second cable and/or one or more electrodes and/or sensors, said fitting having
      a) a nut portion at a first end of said fitting, the nut portion having a diameter which is greater than the diameter of the housing bore at the second end of said housing bore,
      b) a threaded portion on a conical ferrule portion which is configured to threadedly engage with the housing bore in the second end of said female housing, and
      b) the conical ferrule portion is located at a second end of the fitting, the conical ferrule portion being tapered and configured to fit securely into the housing bore so that when the fitting is tightened against a chamfered taper in the second end of the housing bore it forms a watertight seal.

2. The waterproof electrical connector assembly of claim 1 wherein said female housing comprises stainless steel.

3. The waterproof electrical connector assembly of claim 1 wherein said fitting comprises stainless steel.

4. The waterproof electrical connector assembly of claim 1 wherein said female housing and said fitting comprise the same material.

5. The waterproof electrical connector assembly of claim 1 wherein said female housing and said fitting comprise polymeric material, the polymeric material of said housing being at least as hard as the polymeric material of said fitting.

6. The waterproof electrical connector assembly of claim 1 wherein said female housing is made by 3-D printing.

7. The waterproof electrical connector assembly of claim 1 wherein said fitting is a standard threaded fitting of the type used in High-Performance Liquid Chromatography.

8. The waterproof electrical connector assembly of claim 1 wherein said female housing comprises a polymeric material.

9. The waterproof electrical connector assembly of claim 8 wherein the polymeric material is selected from the group consisting of polyetheretherketone, acrylonitrile butyldiene styrene, and nylon.

10. The waterproof electrical connector assembly of claim 1 wherein said fitting comprises a polymeric material.

11. The waterproof electrical connector assembly of claim 10 wherein the polymeric material comprising said fitting is selected from the group consisting polyetheretherketone (PEEK), polytetrafluoroethylene (PTFE), Polyoxymethylene (POM), polyphenylene sulfide (PPS), and polypropylene.

12. The waterproof electrical connector assembly of claim 11 the polymeric material is polytetrafluoroethylene.

* * * * *